(12) United States Patent
Kaiser et al.

(10) Patent No.: US 7,370,031 B2
(45) Date of Patent: May 6, 2008

(54) GENERATION OF HIGH AFFINITY MEDIA

(75) Inventors: Rolf Kaiser, Bellevue, WA (US); Michael J. Carreno, Redmond, WA (US); Eric Bassman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 10/993,685

(22) Filed: Nov. 19, 2004

(65) Prior Publication Data

US 2005/0076027 A1  Apr. 7, 2005

Related U.S. Application Data

(62) Division of application No. 09/900,230, filed on Jul. 6, 2001, now Pat. No. 7,206,775.

(60) Provisional application No. 60/216,106, filed on Jul. 6, 2000.

(51) Int. Cl.
G06F 17/30 (2006.01)

(52) U.S. Cl. .............. 707/2; 707/3; 707/5; 707/10; 707/104.1

(58) Field of Classification Search .............. 707/2, 707/3, 104.1, 5, 10
See application file for complete search history.

(56) References Cited

U.S. PATENT DOCUMENTS 6,539,395 B1  3/2003  Gjerdingen et al. ........ 707/102
6,721,741 B1  4/2004  Eyal et al. ................ 707/10

OTHER PUBLICATIONS

Boneh, D. et al., "Collusion-secure fingerprinting for digital data," *IEEE Trans. Information Theory*, 1998, 44(5), 1897-1905.

Bresin, R. et al., "Synthesis and decoding of emotionally expressive music performance," *IEEE SMC '99 Conference Proceedings. 1999 IEEE Int'l Conf. On Systems, Man, and Cybernetics*, 1999, vol. 4, 317-322.

Camurri, A. et al., "Multi-Paradigm Software Environment for the Real-Time Processing of Sound, Music and Multimedia," *Knowledge-Based Systems*, 1994, 7(2), 114-126.

Camurri, A. et al., "Music and Multimedia Knowledge Representation and Reasoning—The Harp System," *Computer Music J.*, 1995, 19(2sum), 34-58.

Camurri, A., "Music content processing and multimedia: Case studies and emerging applications of intelligent interactive systems," *J. New Music Res.*, 1999, 28(4), 351-363.

(Continued)

*Primary Examiner*—Hung Q Pham
(74) *Attorney, Agent, or Firm*—Woodcock Washburn LLP

(57) ABSTRACT

A system and methods for the automatic transmission of new, high affinity media to a user are provided. In connection with a system that convergently merges perceptual and digital signal processing analysis of media entities for purposes of classifying the media entities, various means are provided to a user for automatically extracting media entities that represent a high (or low) affinity state/space for the user in connection with the generation of a high affinity playlist, channel or station. Techniques for providing a dynamic recommendation engine and techniques for rating media entities are also included are also included. Once a high affinity state/space is identified, the high affinity state/space may be persisted for the user from experience to experience.

12 Claims, 11 Drawing Sheets

OTHER PUBLICATIONS

Cohen, W.W. et al., "Web-collaborative filtering: recommending music by crawling the Web," *Comp. Networks-Int. J. Comp. Telecomm. Networking*, 2000, 33(1-6), 685-698.

Craner, P.M., "New tool for an ancient art—the computer and music," *Comput. Humanities*, 1991, 25(5), 303-313.

DeRoure, D.C. et al., "Content-based navigation of music using melodic pitch contours," *Multimedia Systems*, 2000, 8(3), 190-200.

Gentner, T.Q. et al., "Perceptual classification based on the component structure of song in European starlings," *J. Acoustical Soc. Am.*, Jun. 2000, 107(6), 3369-3381.

Goldman, C.V. et al., "NetNeg: A connectionist-agent integrated system for representing musical knowledge," *Annals. Math. Artificial Intelligence*, 1999, 25(1-2), 69-90.

Hori, T. et al., "Automatic music score recognition/play system based on decision based neural network," *1999 IEEE Third Workshop on Multimedia Signal Processing*, Ostermann, J. et al. (eds.), 1999, 183-184.

Kieckhefer, E. et al., "A computer program for sequencing and presenting complex sounds for auditory neuroimaging studies," *J. Neurosc. Methods*, Aug. 2000, 101(1), 43-48.

Kirk, R. et al., "Midas-Milan—an open distributed processing system for audio signal processing," *J. Audio Enginerr. Soc.*, 1996, 44(3), 119-129.

Krulwich, B., "Lifestyle finder—Intelligent user profiling using large-scale demographic data," *AI Magazine*, 1997, 18(2sum), 37-45.

Li, D. et al., "Classification of general audio data for content-based retrieval," *Pattern Recogn. Letts.*, 2001, 22(5), 533-544.

Liang, R.H. et al., "Impromptu Conductor—A Virtual Reality System for Music Generation Based on Supervised Learning," *Displays*, 1994, 15(3), 141-147.

Logrippo, L., "Cluster analysis for the computer-assisted statistical analysis of melodies," *Computers Humanities*, 1986, 20(1), 19-33.

Moreno, P.J. et al., "Using the Fisher Kernal Method for Web Audio Classification," *2000 IEEE Int'l Conf. On Acoustics, Speech, and Signal Processing*, Proceedings, 2000, vol. 4, 2417-2420.

Pirn, R., "Some Objective and Subjective Aspects of3 Acoustically Variable Halls," *Appl. Acoustics*, 1992, 35(3), 221-231.

Serra, A., "New solutions for the transmission of music. Possible methods in view of the reduction of the pass band," *Revista Espanola de Electronica*, Jul. 1976, 23(260), 34-35 (English language abstract attached).

Smith, M.W.A., "A relational database for the study and quantification of tempo directions in music," *Comput. Humanities*, 1994, 28(2), 107-116.

Spieser, J.M. et al., "Signal processing computations using the generalized singular value decomposition," *Proceeings of SPIE—The Int'l Society for Optical Engineering. Real Time Signal Processing VII*, Bellingham, WA, 1984, 47-55.

Strawn, J. (ed.), "Digital Audio Engineering: An Anthology," *Digital Audio Eng. An Anthol*, Los Altos, CA, 1985.

Yoder, M.A. et al., "Using Multimedia and the Web to teach the theory of digital multimedia signals," *Proceedings. Frontiers in Education, 1995 25th Annual Conference*. Engineering Education for the 21st Century, IEEE, Budny, D. et al. (eds.), Nov. 1-4, 1995, vol. 2, Atlanta, GA.

Zhang, T. et al., "Audio content analysis for online audiovisual data segmentation and classification," *IEEE Trans. on Speech and Audio Processing*, May 2001, 9(4), 441-457.

Zhang, T. et al., "Heuristic approach for generic audio data segmentation and annotation," *Proceedings ACM Multimedia 99*, 1999, 67-76.

Pesavento, M. et al., Unitary root music with a real-valued eigendecomposition: A theoretical and experimental performance study, *IEEE Trans. Signal Processing*, 2000, 48(5), 1306-1314.

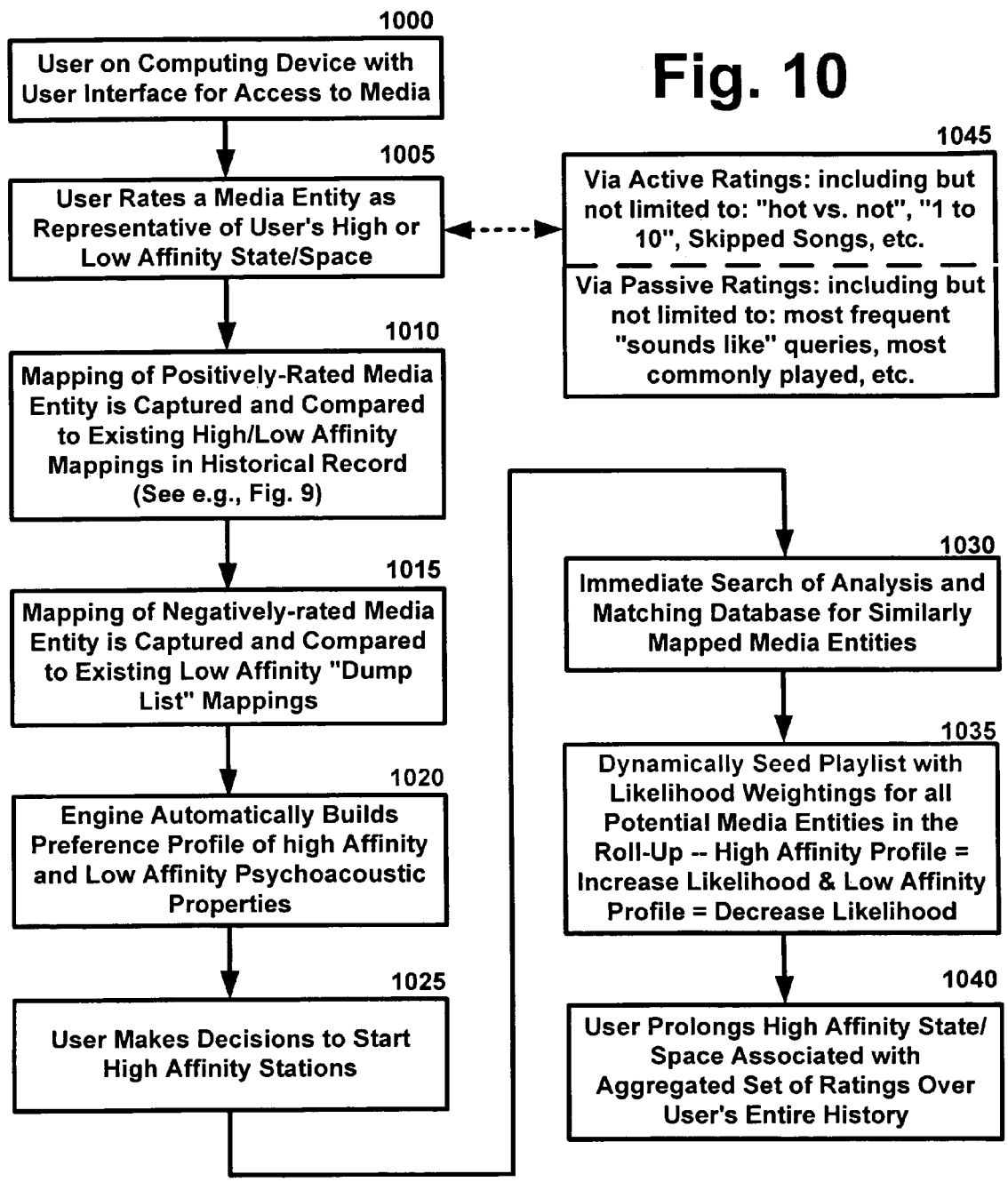

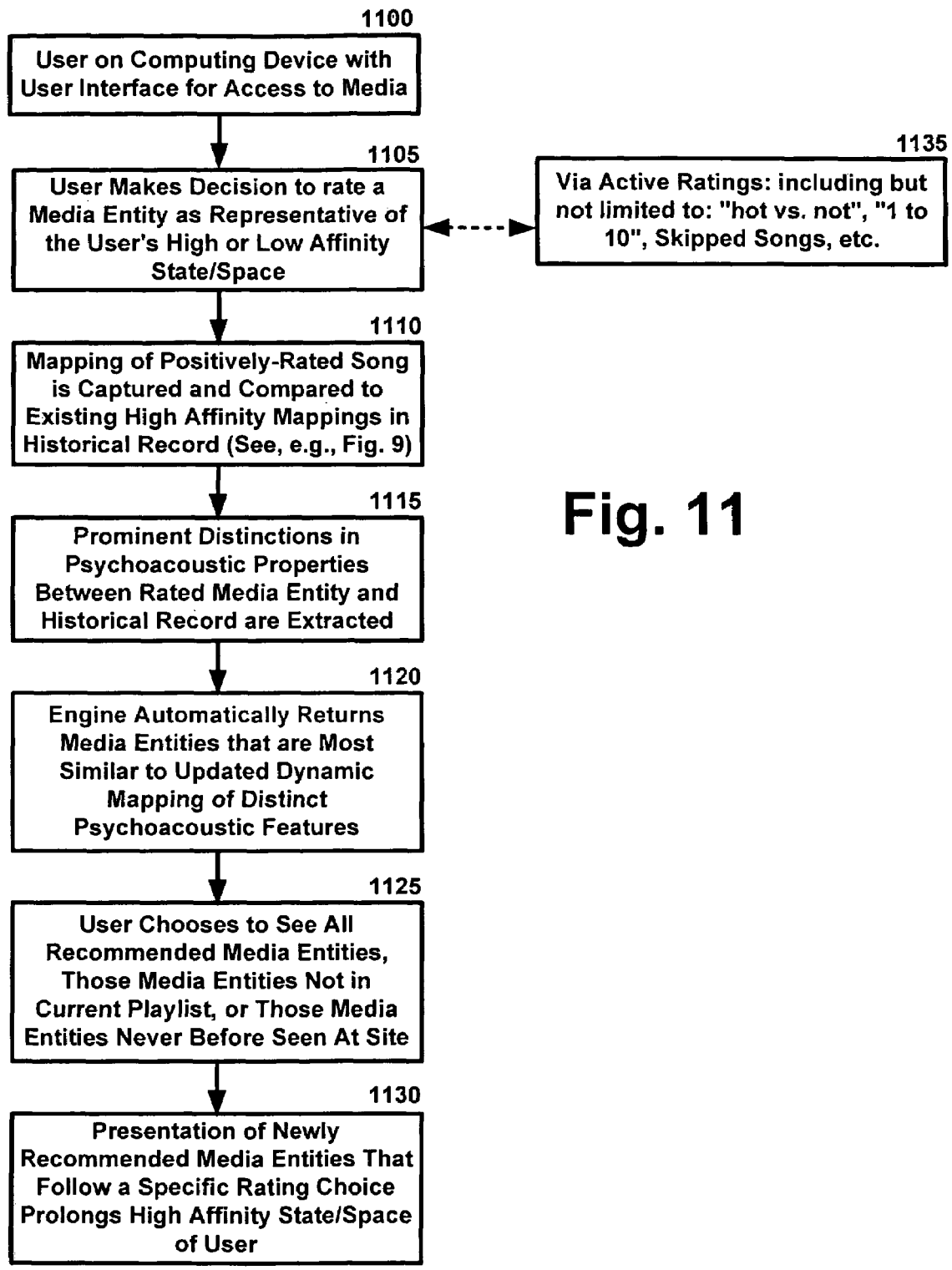

GENERATION OF HIGH AFFINITY MEDIA

CROSS REFERENCE TO RELATED APPLICATIONS

This application is a divisional application off of U.S. patent application Ser. No. 09/900,230, filed Jul. 6, 2001, now U.S. Pat. No. 7,206,775 which claims the benefit of U.S. Provisional Application Ser. No. 60/216,106, filed Jul. 6, 2000, the contents of all are incorporated herein by reference in its entirety.

FIELD OF THE INVENTION

The present invention relates to a system and methods for the automatic transmission of new, high affinity media to users of computing devices connected to a network.

BACKGROUND OF THE INVENTION

Classifying information that has subjectively perceived attributes or characteristics is difficult. When the information is one or more musical compositions, classification is complicated by the widely varying subjective perceptions of the musical compositions by different listeners. One listener may perceive a particular musical composition as "hauntingly beautiful" whereas another may perceive the same composition as "annoyingly twangy."

In the classical music context, musicologists have developed names for various attributes of musical compositions. Terms such as adagio, fortissimo, or allegro broadly describe the strength with which instruments in an orchestra should be played to properly render a musical composition from sheet music. In the popular music context, there is less agreement upon proper terminology. Composers indicate how to render their musical compositions with annotations such as brightly, softly, etc., but there is no consistent, concise, agreed-upon system for such annotations.

As a result of rapid movement of musical recordings from sheet music to pre-recorded analog media to digital storage and retrieval technologies, this problem has become acute. In particular, as large libraries of digital musical recordings have become available through global computer networks, a need has developed to classify individual musical compositions in a quantitative manner based on highly subjective features, in order to facilitate rapid search and retrieval of large collections of compositions.

Musical compositions and other information are now widely available for sampling and purchase over global computer networks through online merchants such as AMAZON.COM®, BARNESANDNOBLE.COM®, CDNOW.COM®, etc. A prospective consumer can use a computer system equipped with a standard Web browser to contact an online merchant, browse an online catalog of pre-recorded music, select a song or collection of songs ("album"), and purchase the song or album for shipment direct to the consumer. In this context, online merchants and others desire to assist the consumer in making a purchase selection and desire to suggest possible selections for purchase. However, current classification systems and search and retrieval systems are inadequate for these tasks.

A variety of inadequate classification and search approaches are now used. In one approach, a consumer selects a musical composition for listening or for purchase based on past positive experience with the same artist or with similar music. This approach has a significant disadvantage in that it involves guessing because the consumer has no familiarity with the musical composition that is selected.

In another approach, a merchant classifies musical compositions into broad categories or genres. The disadvantage of this approach is that typically the genres are too broad. For example, a wide variety of qualitatively different albums and songs may be classified in the genre of "Popular Music" or "Rock and Roll."

In still another approach, an online merchant presents a search page to a client associated with the consumer. The merchant receives selection criteria from the client for use in searching the merchant's catalog or database of available music. Normally the selection criteria are limited to song name, album title, or artist name. The merchant searches the database based on the selection criteria and returns a list of matching results to the client. The client selects one item in the list and receives further, detailed information about that item. The merchant also creates and returns one or more critics' reviews, customer reviews, or past purchase information associated with the item.

For example, the merchant may present a review by a music critic of a magazine that critiques the album selected by the client. The merchant may also present informal reviews of the album that have been previously entered into the system by other consumers. Further, the merchant may present suggestions of related music based on prior purchases of others. For example, in the approach of AMAZON.COM®, when a client requests detailed information about a particular album or song, the system displays information stating, "People who bought this album also bought . . . " followed by a list of other albums or songs. The list of other albums or songs is derived from actual purchase experience of the system. This is called "collaborative filtering."

However, this approach has a significant disadvantage, namely that the suggested albums or songs are based on extrinsic similarity as indicated by purchase decisions of others, rather than based upon objective similarity of intrinsic attributes of a requested album or song and the suggested albums or songs. A decision by another consumer to purchase two albums at the same time does not indicate that the two albums are objectively similar or even that the consumer liked both. For example, the consumer might have bought one for the consumer and the second for a third party having greatly differing subjective taste than the consumer. As a result, some pundits have termed the prior approach as the "greater fools" approach because it relies on the judgment of others.

Another disadvantage of collaborative filtering is that output data is normally available only for complete albums and not for individual songs. Thus, a first album that the consumer likes may be broadly similar to second album, but the second album may contain individual songs that are strikingly dissimilar from the first album, and the consumer has no way to detect or act on such dissimilarity.

Still another disadvantage of collaborative filtering is that it requires a large mass of historical data in order to provide useful search results. The search results indicating what others bought are only useful after a large number of transactions, so that meaningful patterns and meaningful similarity emerge. Moreover, early transactions tend to over-influence later buyers, and popular titles tend to self-perpetuate.

In a related approach, the merchant may present information describing a song or an album that is prepared and distributed by the recording artist, a record label, or other entities that are commercially associated with the recording. A disadvantage of this information is that it may be biased, it may deliberately mischaracterize the recording in the hope of increasing its sales, and it is normally based on inconsistent terms and meanings.

In still another approach, digital signal processing (DSP) analysis is used to try to match characteristics from song to song, but DSP analysis alone has proven to be insufficient for classification purposes. While DSP analysis may be effective for some groups or classes of songs, it is ineffective for others, and there has so far been no technique for determining what makes the technique effective for some music and not others. Specifically, such acoustical analysis as has been implemented thus far suffers defects because 1) the effectiveness of the analysis is being questioned regarding the accuracy of the results, thus diminishing the perceived quality by the user and 2) recommendations can only be made if the user manually types in a desired artist or song title from that specific website. Accordingly, DSP analysis, by itself, is unreliable and thus insufficient for widespread commercial or other use.

Accordingly, there is a need for an improved method of classifying information that is characterized by the convergence of subjective or perceptual analysis and DSP acoustical analysis criteria. With such a classification technique, it would be further desirable to leverage song-by-song analysis and matching capabilities to automatically and/or dynamically personalize a high affinity network-based experience for a user. In this regard, there is a need for a mechanism that can enable a client to automatically retrieve information about one or more musical compositions, user preferences, ratings, or other sources of mappings to personalize an experience for listener(s).

SUMMARY OF THE INVENTION

In view of the foregoing, the present invention provides a system and methods for the automatic transmission of new, high affinity media tailored to a user. In connection with a system that convergently merges perceptual and digital signal processing analysis of media entities for purposes of classifying the media entities, the present invention provides various means to a user for automatically extracting media entities that represent a high (or low) affinity state/space for the user in connection with the generation of a high affinity playlist, channel or station. Techniques for providing a dynamic recommendation engine and techniques for rating media entities are also included. Once a high affinity state/space is identified, the high affinity state/space may be persisted for a user from experience to experience.

Other features of the present invention are described below.

BRIEF DESCRIPTION OF THE DRAWINGS

The system and methods for the automatic transmission of new, high affinity media are further described with reference to the accompanying drawings in which:

FIG. 10 illustrates an exemplary process wherein a user's preference profile is dynamically updated; and FIG. 11 illustrates an exemplary ratings-based process in accordance with the present invention for dynamically updating a recommendation engine.

DETAILED DESCRIPTION OF ILLUSTRATIVE EMBODIMENTS

Overview

The present invention provides a system and method whereby new, high affinity media are transmitted to a user of a networked computing device. The present invention leverages the song-by-song analysis and matching capabilities of modern music matching and classification techniques. For example, commonly assigned U.S. Pat. No. 6,545,209, filed Jul. 5, 2001, hereinafter the analysis and matching system, describes novel techniques for analyzing and matching based upon musical property mappings, such as may be defined for a song or a media station. The analysis and matching system enables searching of an analysis and matching database, based upon high affinity input mappings extracted or captured in accordance with the present invention, for the purpose of returning songs that are correlated to the input mappings. The present invention takes such technique(s) yet another step further by automatically personalizing a high affinity network-based media experience, such as a Web-based radio experience of a computing device, for a user. In this regard, the present invention provides an array of dynamically-generated or one-step personalization functionality advancements that support the automatic transmission of new, high affinity media to an end user of any network-enabled computing device via wired or wireless means.

Exemplary Computer and Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having access to appropriate classification data.

Figure 1:
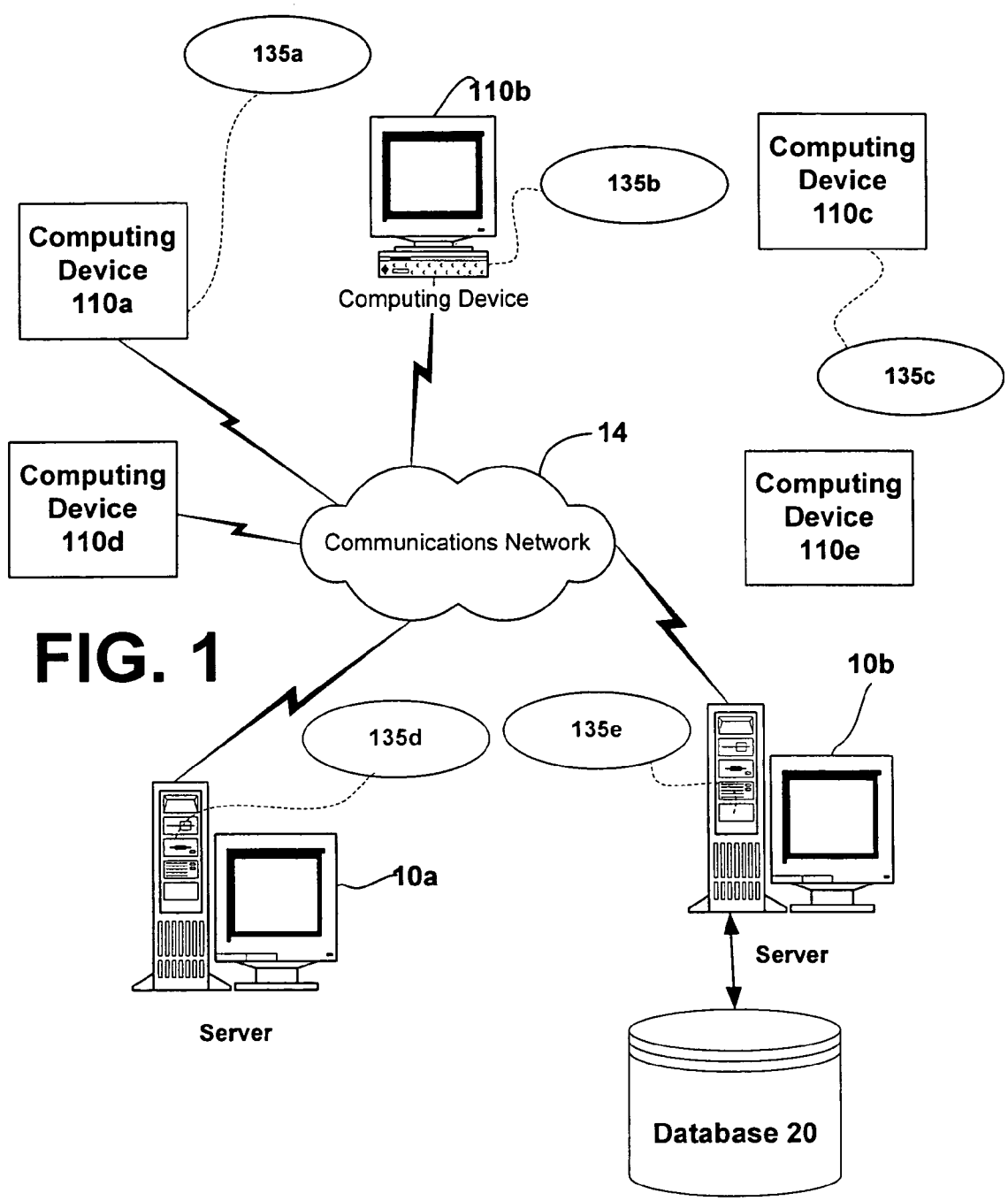
FIG. 1 is a block diagram representing an exemplary network environment in which the present invention may be implemented.

FIG. 1 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to provide classification services for different types of content such as music, video, other audio, etc. In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 in accordance with the present invention, such as a database 20 for storing classification information, music and/or software incident thereto. Thus, the present invention can be utilized in a computer network environment having client computers 110a, 110b, etc. for accessing and interacting with a computer network 14 and server computers 10a, 10b, etc. for interacting with client computers 110a, 110b, etc. and other devices 111 and databases 20.

Classification

In accordance with one aspect of the present invention, a unique classification is implemented which combines human and machine classification techniques in a convergent manner, from which a canonical set of rules for classifying music may be developed, and from which a database, or other storage element, may be filled with classified songs. With such techniques and rules, radio stations, studios and/or anyone else with an interest in classifying music can classify new music. With such a database, music association may be implemented in real time, so that playlists or lists of related (or unrelated if the case requires) media entities may be generated. Playlists may be generated, for example, from a single song and/or a user preference profile in accordance with an appropriate analysis and matching algorithm performed on the data store of the database. Nearest neighbor and/or other matching algorithms may be utilized to locate songs that are similar to the single song and/or are suited to the user profile.

Figure 2:
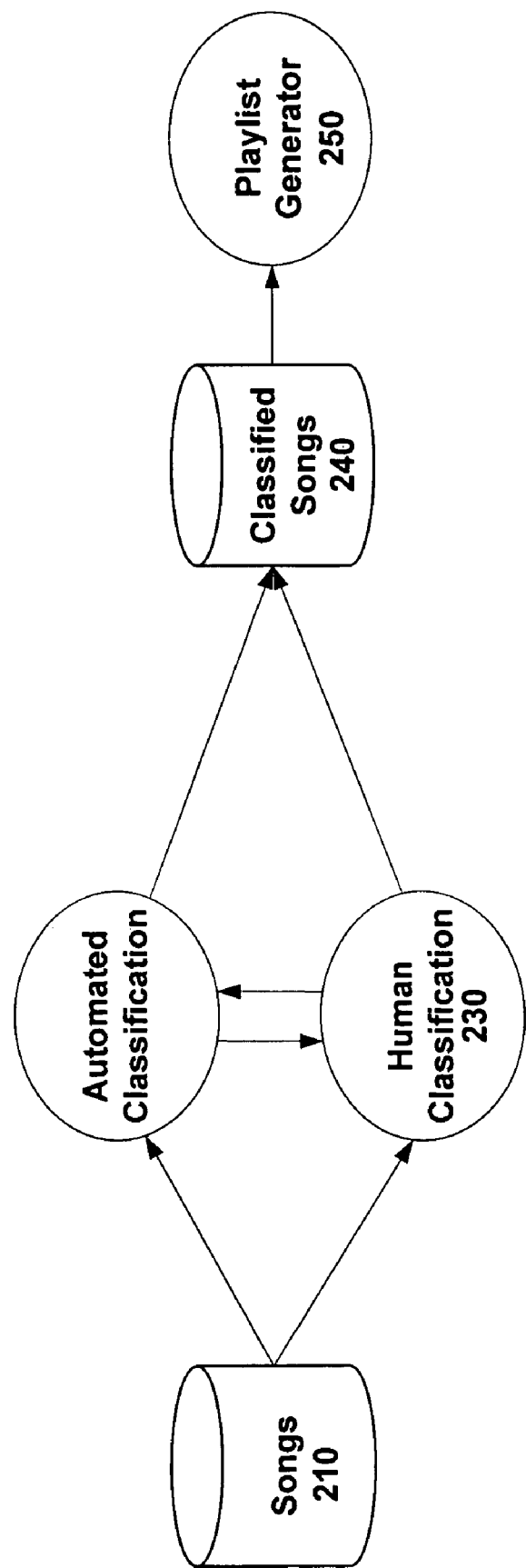
FIG. 2 is a high level block diagram representing the media content classification system utilized to classify media, such as music, in accordance with the present invention.

FIG. 2 illustrates an exemplary classification technique in accordance with the present invention. Media entities, such as songs 210, from wherever retrieved or found, are classified according to human classification techniques at 220 and also classified according to automated computerized DSP classification techniques at 230. 220 and 230 may be performed in either order, as shown by the dashed lines, because it is the marriage or convergence of the two analyses that provides a stable set of classified songs at 240. As discussed above, once such a database of songs is classified according to both human and automated techniques, the database becomes a powerful tool for generating songs with a playlist generator 250. A playlist generator 250 may take input(s) regarding song attributes or qualities, which may be a song or user preferences, and may output a playlist, recommend other songs to a user, filter new music, etc. depending upon the goal of using the relational information provided by the invention. In the case of a song as an input, techniques for human-based classification, automated computerized DSP classification, or some combination thereof as described above, are utilized to determine the attributes, qualities, likelihood of success, etc. of the song. In the case of user preferences as an input, a search may be performed for songs that match the user preferences to create a playlist or make recommendations for new music. In the case of filtering new music, the rules used to classify the songs in database 240 may be leveraged to determine the attributes, qualities, genre, likelihood of success, etc. of the new music. In effect, the rules can be used as a filter to supplement any other decision making processes with respect to the new music.

Figure 3:
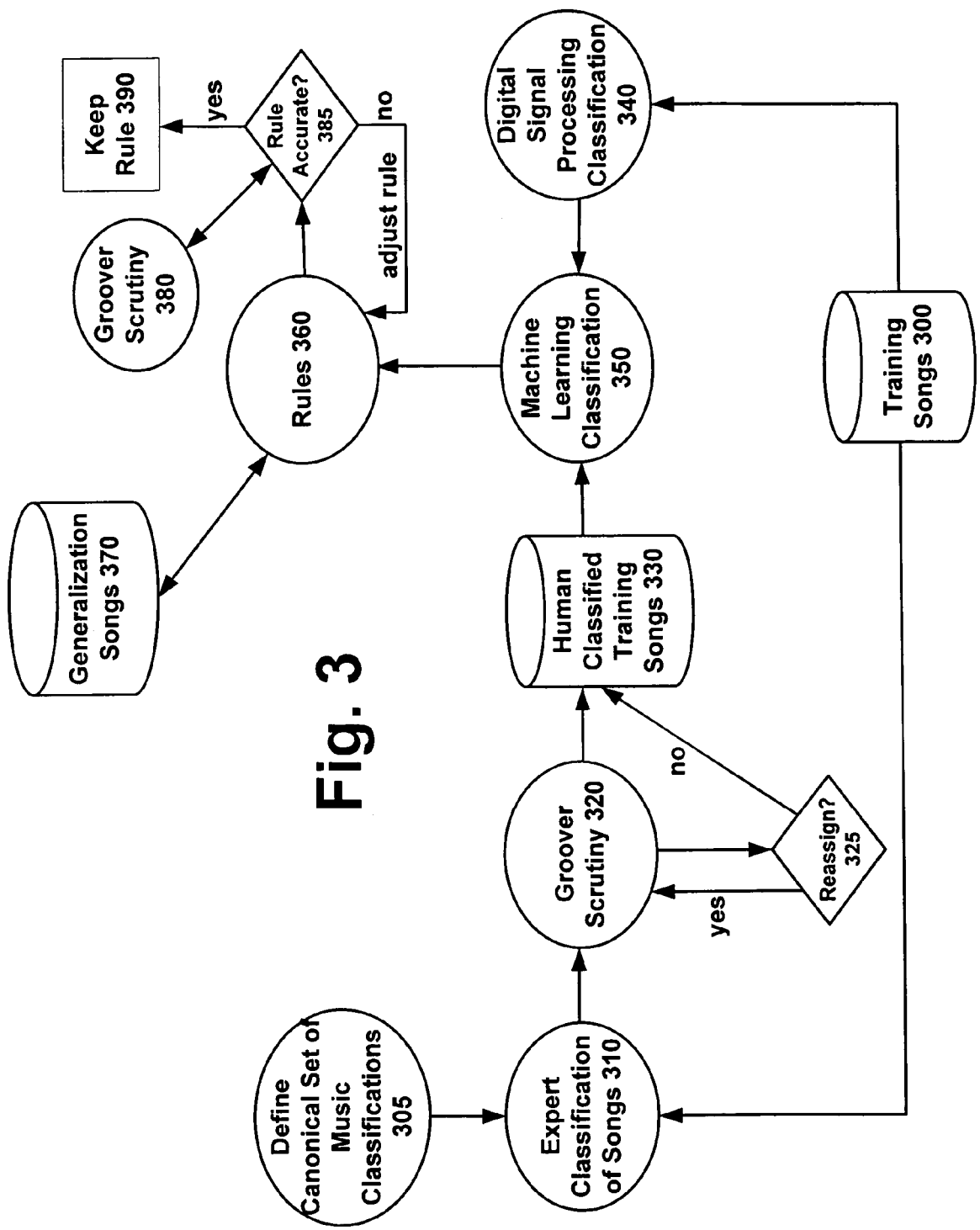
FIG. 3 is block diagram illustrating an exemplary method of the generation of general media classification rules from analyzing the convergence of classification in part based upon subjective and in part based upon digital signal processing techniques.

FIG. 3 illustrates an embodiment of the invention, which generates generalized rules for a classification system. A first goal is to train a database with enough songs so that the human and automated classification processes converge, from which a consistent set of classification rules may be adopted, and adjusted to accuracy. First, at 305, a general set of classifications are agreed upon in order to proceed consistently i.e., a consistent set of terminology is used to classify music in accordance with the present invention. At 310, a first level of expert classification is implemented, whereby experts classify a set of training songs in database 300. This first level of expert is fewer in number than a second level of expert, termed herein a groover, and in theory has greater expertise in classifying music than the second level of expert or groover. The songs in database 300 may originate from anywhere, and are intended to represent a broad cross-section of music. At 320, the groovers implement a second level of expert classification. There is a training process in accordance with the invention by which groovers learn to consistently classify music, for example to 92-95% reproducibility of attribute classification across different groovers. The groover scrutiny reevaluates the classification of 310, and reclassifies the music at 325 if the groover determines that reassignment should be performed before storing the song in human classified training song database 330.

Before, after or at the same time as the human classification process, the songs from database 300 are classified according to digital signal processing (DSP) techniques at 340. Exemplary classifications for songs include, inter alia, tempo, sonic, melodic movement and musical consonance characterizations. Classifications for other types of media, such as images, video or software are also contemplated, as they would follow an analogous process of classification, although the specific attributes measured would obviously be different. The quantitative machine classifications and qualitative human classifications for a given piece of media, such as a song, are then placed into what is referred to herein as a classification chain, which may be an array or other list of vectors, wherein each vector contains the machine and human classification attributes assigned to the piece of media. Machine learning classification module 350 marries the classifications made by humans and the classifications made by machines, and in particular, creates a rule when a trend meets certain criteria. For example, if songs with heavy activity in the frequency spectrum at 3 kHz, as determined by the DSP processing, are also characterized as 'jazzy' by humans, a rule can be created to this effect. The rule would be, for example: songs with heavy activity at 3 kHz are jazzy. Thus, when enough data yields a rule, machine learning classification module 350 outputs a rule to rule set 360. While this example alone may be an oversimplification, since music patterns are considerably more complex, it can be appreciated that certain DSP analyses correlate well to human analyses.

However, once a rule is created, it is not considered a generalized rule. The rule is then tested against like pieces of media, such as song(s), in the database 370. If the rule works for the generalization song(s) 370, the rule is considered generalized. The rule is then subjected to groover scrutiny 380 to determine if it is an accurate rule at 385. If the rule is inaccurate according to groover scrutiny, the rule is adjusted. If the rule is considered to be accurate, then the rule is kept as a relational rule e.g., that may classify new media.

The above-described technique thus maps a pre-defined parameter space to a psychoacoustic perceptual space defined by musical experts. This mapping enables content-based searching of media, which in part enables the automatic transmission of high affinity media content, as described below.

Automatic Transmission of High Affinity Media Content

The present invention relates generally to the broadcasting or rendering of media from a network-enabled computing device, such as a radio, or a radio broadcast rendered via a network portal, such as a Web site. The personalization process works via an interplay of features with the above-described song analysis and matching system. A user makes a specific choice that represents a high affinity state/space for the user, such as a choice representing something desirable to the specific user about a piece or set of media. The choice may be the choice of a piece of media itself, a choice regarding a characteristic of a song or songs more generally, or a choice regarding a characteristic of the user. The specific choice within any of the features can be represented as a mapping along a set of fundamental musical properties that captures a user's psychoacoustic preferences. The song analysis and matching system then scans the database for other musical entities that have a similar mapping of musical properties. These newly found entities are then automatically returned to the user. The return of these results leverages the user's original choice to provide the user with an experience that tailors itself automatically to the user's specific psychoacoustic preferences, and hence prolongs the user's high affinity state/space. The linking works because every piece of audio media transmitted to the user is mapped on a set of fundamental musical properties that in sum can represent a user's high affinity, state/space.

Existing artist and genre-based ways to specify a radio stream are very broad and hence have not captured a user's specific psychoacoustic preferences, and hence cannot as effectively prolong a user's high affinity stat/space.

In connection with the above described song analysis, classification and matching processes, the present invention provides advancements in the area of automatic personalization Of a user's media experience, all of which allow the user to get a highly targeted set of music via only a small amount of effort. By leveraging the song analysis and matching techniques, users can accurately "ask" for music for which there will be high affinity. A user specifies psychoacoustic preferences with the information he or she presents to the song analysis and matching system. This "asking" process takes a variety of forms and is described in more detail in commonly assigned U.S. patent application Ser. No. 09/638,907 with respect to how user's specific preference(s) are translated into an actual playlist.

FIGS. 4 through 7 illustrate different embodiments in which a user specifies psychoacoustic preferences, which then form the basis for a search of the matching and analysis database, which in turn results in the automatic transmission of high affinity media to the user.

Figure 4:
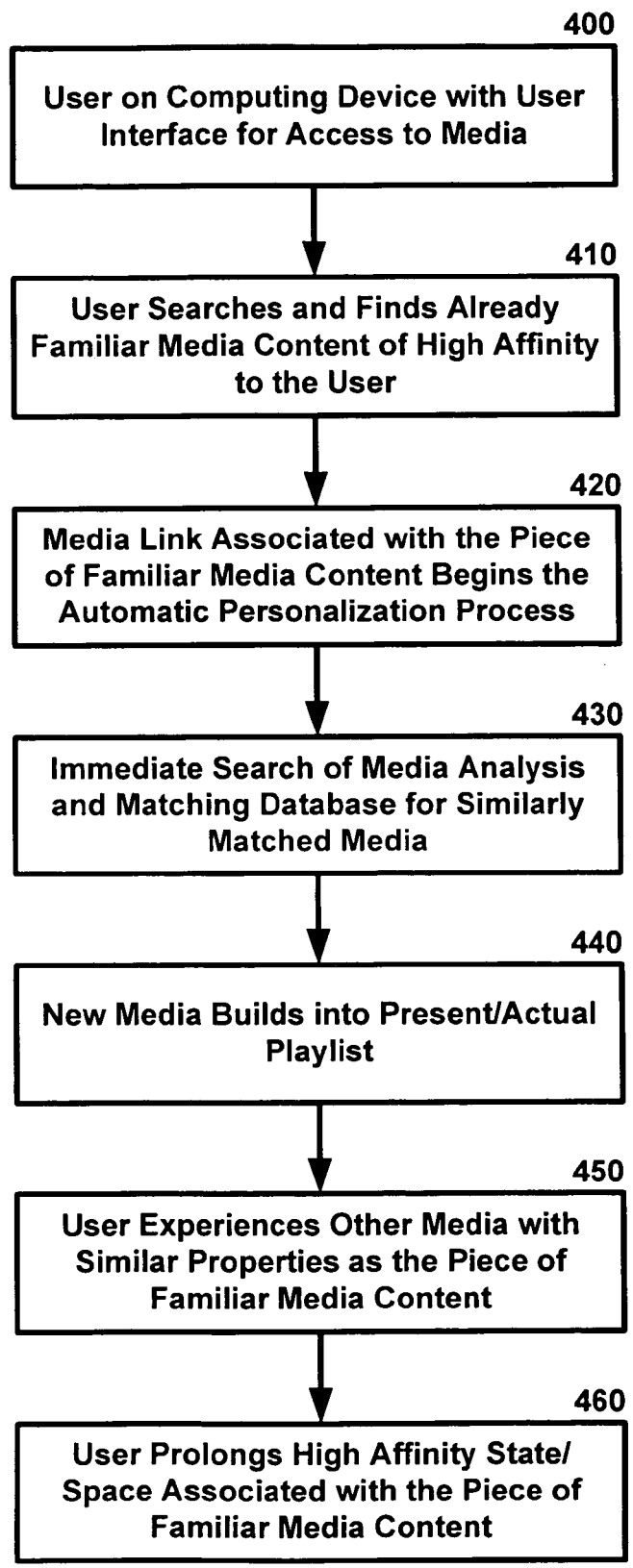
FIG. 4 illustrates an embodiment of the present invention whereby a media station, is tailored to a user through the user's specification of a piece of media.

FIG. 4 illustrates an embodiment of the present invention whereby a media station, such as a radio station, is tailored to a user through the user's specification of a piece of media, such as a song. From the characteristics of the song, a high affinity playlist is generated. At 400, a user finds a computing device having a user interface in accordance with the present invention for accessing any of a variety of types of media, such as music. The user interface does not have to follow any particular format, and a user may use any known input device for entering data into the system. At 410, a user searches for, locates, finds or otherwise designates via an input device a familiar song that the user finds pleasing psychoacoustically. At 420, the selection of the media link itself begins the automatic personalization process, although an affirmative action on the part of the user could also be implemented to begin the process. At 430, as a result of the start of the automatic personalization process, an immediate search of media analysis and matching database for similarly matched media is performed. At 440, the results of step 430, namely the return of media similarly matched to the song selected, are built into the present or actual playlist of the media station. At 450, the user experiences other media with similar properties as the piece of familiar media content via the playlist formed at 440. At 460, the user can opt to prolong the high affinity state/space associated with the selected piece of familiar media content.

Thus, the user may launch or instantiate a radio station on a network-enabled computing device in a one-step personalization process, whereby the process automatically plays a set of songs with similar fundamental musical properties as the chosen song. This process connects songs for which a user has high affinity to the base song by finding other songs that have similar mappings and hence a song likelihood of continuing the user's high affinity state/space. Automatically returned is the related playlist of songs. The success of the above process, in part, hinges on the classification scheme utilized at the front end of the present invention, wherein both perceptual analysis techniques and acoustic analysis techniques are utilized, providing a degree of matching success in connection with the media analysis and matching database.

Figure 5:
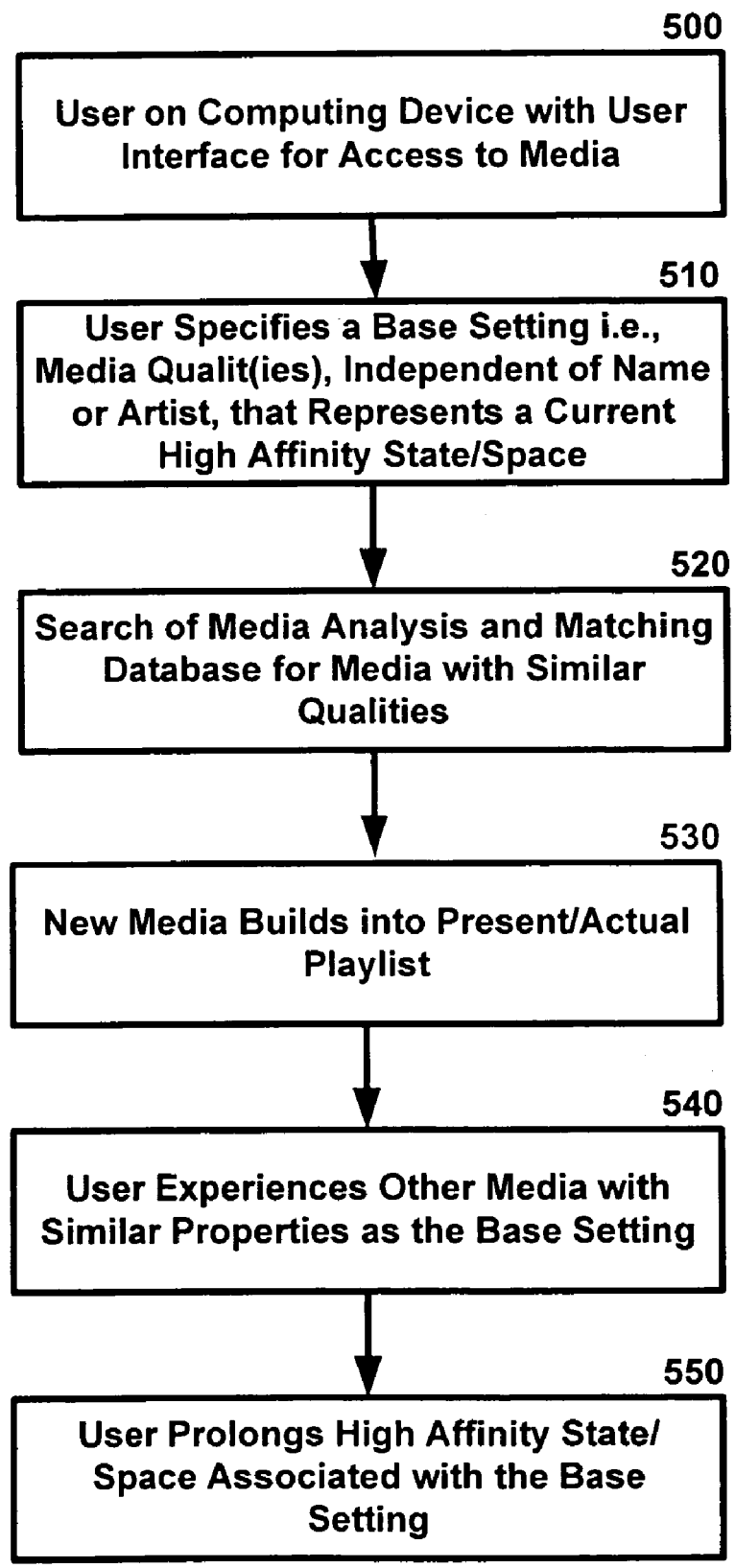
FIG. 5 illustrates an embodiment of the present invention whereby a media station is tailored to a user through the user's specification of partial specifiers.

FIG. 5 illustrates an embodiment of the present invention whereby a media station, such as a radio station, is tailored to a user through the user's specification of partial-song intuitive psychoacoustic specifiers. A user can specify the type of music that the user wants to hear by defining only a partial element of a song. In other words, a user may ask for music targeted on a subset of fundamental musical properties. In one implementation, at 500, a user finds a computing device having a user interface in accordance with the present invention for accessing any of a variety of types of media, such as music. At 510, the user specifies base setting(s) or media qualities, independent of name or artist, that represent a current high affinity state/space for the user. Thus, the user specifies intuitive, as opposed to solely by artist or genre, music descriptors that the user already understands, such as mood descriptors (happy, sad, energetic, groovy, soothing), tempo descriptors (fastest, fast, moderate, slow, slowest), or weight descriptors (heaviest, heavy, moderate, light, lightest), or combinations of the aforementioned descriptors and/or other like descriptors. Alternatively, these music descriptors may be combined with further restricting criteria, such as music by a particular artist or within a particular genre only. An exemplary restriction includes a restriction to the "fastest, happy songs by the artist Bob Dylan." When finished specifying, the user may send the descriptor set to the database for matching via a one step personalization process. The descriptor set is directly mapped into the database via the analysis and matching system, and songs With similar psychoacoustic properties as the specified descriptors are automatically returned at 520 and 530 for experience by the user at 540, although the returned songs have no restrictions for any non-set or non-specified properties. In this manner, the user can have a playlist generated via a limited musical property mapping without thinking according to a larger unit of analysis—song, album, artist, genre. At 550, the user may choose to prolong the high affinity state/space associated with the selected piece of familiar media content.

Figure 6:
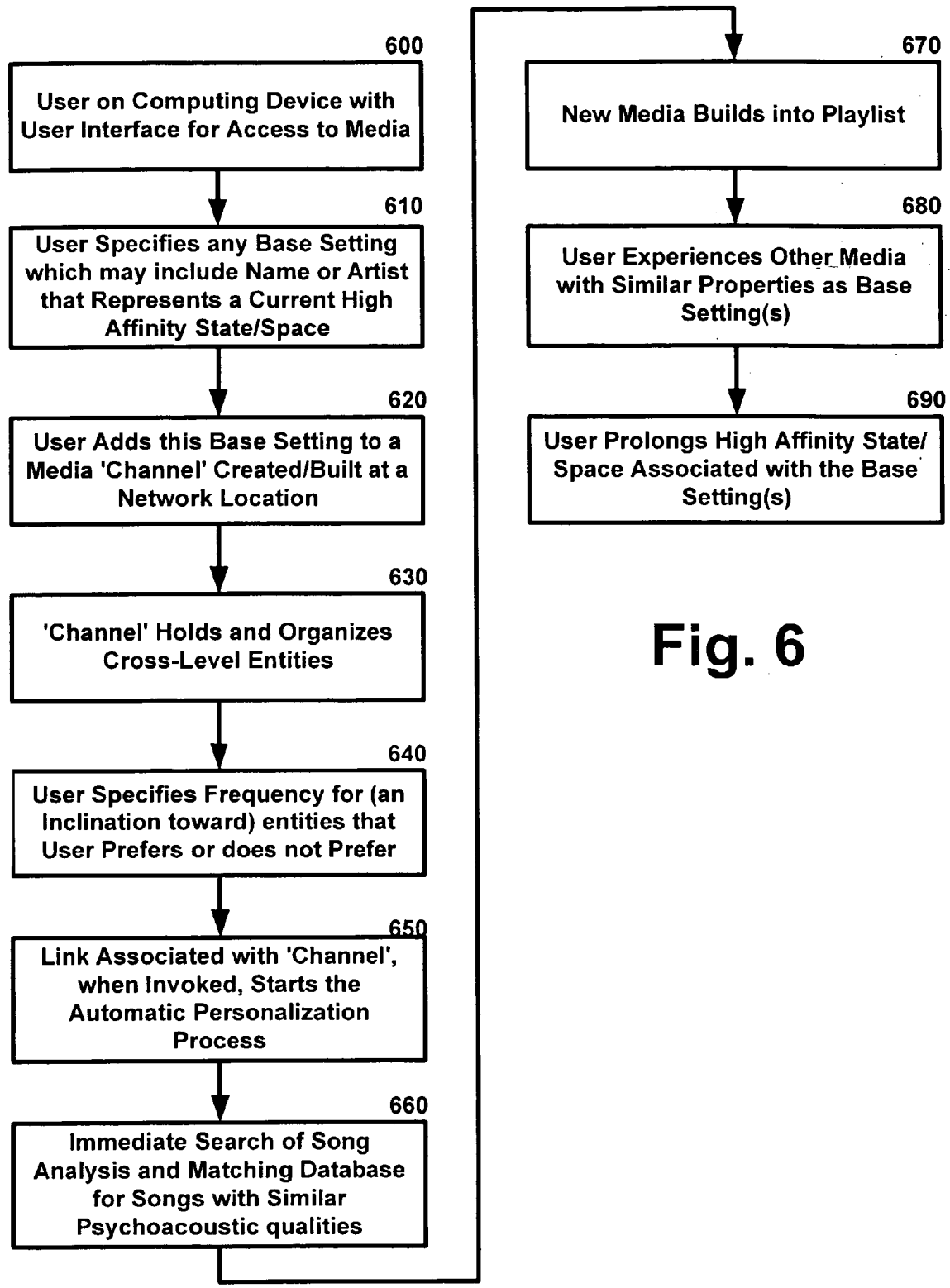
FIG. 6 illustrates an embodiment of the present invention whereby a media station is tailored to a user through multi-level music organization and a one step process for providing a personalized high affinity station.

FIG. 6 illustrates an embodiment of the present invention whereby a media station, such as a radio station, is tailored to a user through multi-level music organization and a one step process for providing a personalized high affinity station. A user can specify the type of music the user wants to hear via high-affinity matching with various levels of music classification, including but not limited to: partial-song, song, album, artist, genre. These various levels exist below, at, and above the song level of classification. In one implementation, at 600, a user finds a computing device having a user interface in accordance with the present invention for accessing any of a variety of types of media, such as music. At 610, the user specifies base setting(s) or media qualities, which may include song name, album, artist, genre, etc., as well as the intuitive descriptors described previously, that represent a current high affinity state/space for the user. At 620, the user may add these base setting(s) to a media 'channel' built at the network location. At 630, the base setting(s) are processed, organized and stored according to the cross-level entities represented thereby. Thus, a user may group high affinity preferences across multiple levels of music classification into personal "stations". Additionally, at 640, for further specification and in recognition that not all preferences are equal, a user may specify an inclination towards or a frequency for entities to emphasize the relative importance of the preference to the user. In an exemplary embodiment, the frequency with which each station entry has matching songs returned is based upon the weighting preference given by the user, for example, "A lot", "Some", "A little", or "Never." Since the mappings for all preferences entered are captured via the personal station, selecting the personal station begins one step personalization of media to the user at 650. Selecting the personal station causes the mappings for the entered preferences to automatically run through the analysis and matching system at 660, and returned at 670 is a high affinity mixed playlist with songs that are psychoacoustically similar to entries on the station. U.S. patent application Ser. No. 09/638,907 describes more specific methods for playlist construction based upon frequency of preferences and the like. At 680, the user experiences other media with similar properties as the preferences of the base setting(s) via the playlist formed at 670. At 690, the user can opt to prolong the high affinity state/space associated with the newly formed channel generated from the base setting(s).

Figure 7:
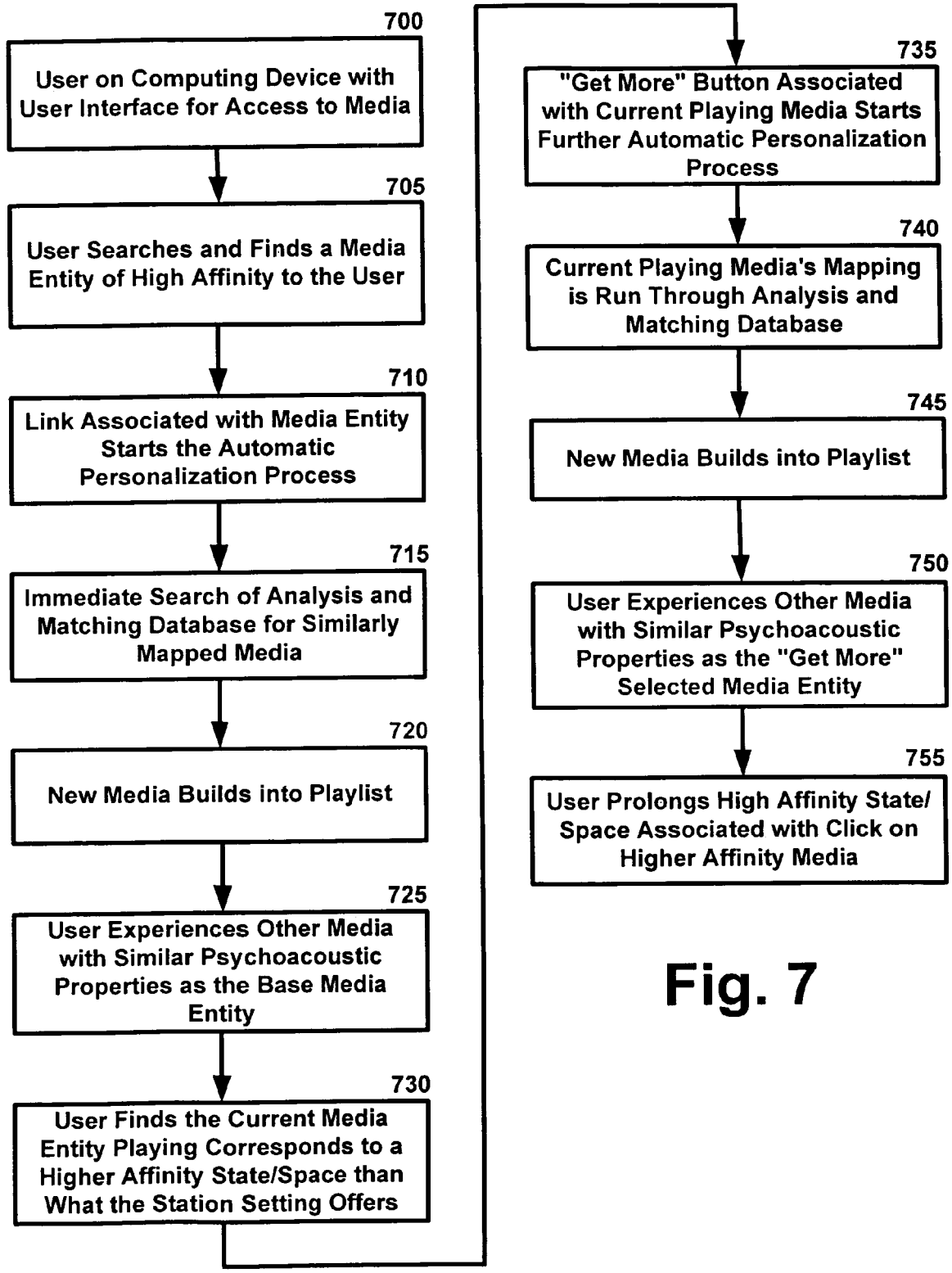
FIG. 7 illustrates an embodiment of the present invention whereby a media station is tailored to a user through a one-step personalized "Get More" station reprogram technique.

FIG. 7 illustrates an embodiment of the present invention whereby a media station, such as a radio station, is tailored to a user through a one-step personalized "Get More" station reprogram technique. For example, this technique could supplement the personal station listening experience described in connection with FIG. 6, or operate upon any playlist currently broadcast to a user based upon an underlying set of preferences, however specified. While listening to a particular song, a user can specify that the current playing song better corresponds to a higher affinity space/state at that time than the current station setting. The user requests to "get more" which instructs the system to find more songs like the current one. In effect, and partly in recognition of a user that doesn't know exactly how to specify what he or she likes to a tee, but knows what he or she likes when the user hears it, the present embodiment allows a user to specify the properties of the current playing song, by selecting the current playing song, in order to hone the user's preferences. This then captures the musical property mapping of the currently playing song, automatically runs the mapping through the analysis and matching system, and returns a high affinity playlist of songs that replaces the existing station. This process automatically connects the user's high affinity towards the current song with other songs that have similar mappings and hence a strong likelihood of continuing the user's high affinity state/space.

Thus, in exemplary detail, at 700, a user finds a computing device having a user interface in accordance with the present invention for accessing any of a variety of types of media, such as music. At 705, the user searches and finds a media entity, such as a song, of high affinity to the user. At 710, the link associated with the song starts the automatic personalization process as described in connection with FIG. 4, although any of the above-described embodiments may be used to build an initial high affinity playlist. At 715, a search of the analysis and matching database is performed to retrieve similarly mapped songs for building into an initial playlist at 720. At 725, the user begins listening to the newly retrieved media from the initial playlist. At 730, the user decides that the current song playing corresponds to a higher affinity state/space than what the playlist offers more generally. Thus, at 735, the user selects a link or other input component to indicate that the user would like to specify his or her preferences more in line with the presently playing song, which begins an automatic personalization process that further hones a playlist to the user's newly specified preference for the presently playing song. At 740, the mappings of the currently playing song are run through the analysis and matching database, to return new media entities for a new playlist at 745. At 750, the user experiences other media with similar psychoacoustic properties as the "Get More" selected song. At 755, the user can opt to prolong the high affinity state/space associated with the newly formed playlist generated as a consequence of the "Get More" selected song. In an alternate embodiment, the mappings represented by the "Get More" song may be used to supplement the mappings represented by the initial playlist, such that the "tweaking" of the playlist is more subtle than generating a brand new playlist.

The "Get More" mapping may be easily extended to refer to the intuitive music descriptors, such as mood, tempo, and weight, to provide specific tailoring of future playlists along one of those dimensions. For example, one of ordinary skill in the art can readily appreciate an implementation of "Get Faster" and "Get Slower" controls, the activation of which may indicate a user's affinity for music whose corresponding attribute (tempo) lies more in the specified direction. As with the "Get More" control, the resulting personalization may apply to either the creation of a new playlist, or a further honing of the currently-playing one.

Supplementing the above techniques, the present invention may store a user's historical record of stations, pieces of media selected and/or other user preferences. Thus, the methods of the present invention include tracking a user's historical record of station settings and the songs played in those stations. Thus, in the case of a radio station implemented by a network enabled computing device, the present invention stores a historical playlist record of all songs played in all stations ever listened to at the radio station by a specific user. This record is stored even when the user has left the site and then returns e.g., this may occur via cookie(s) if user is not logged in, and by login name when a user does log in. This historical record allows for several automatic personalization improvements that further leverage the capabilities of the song analysis and matching system.

Figure 8:
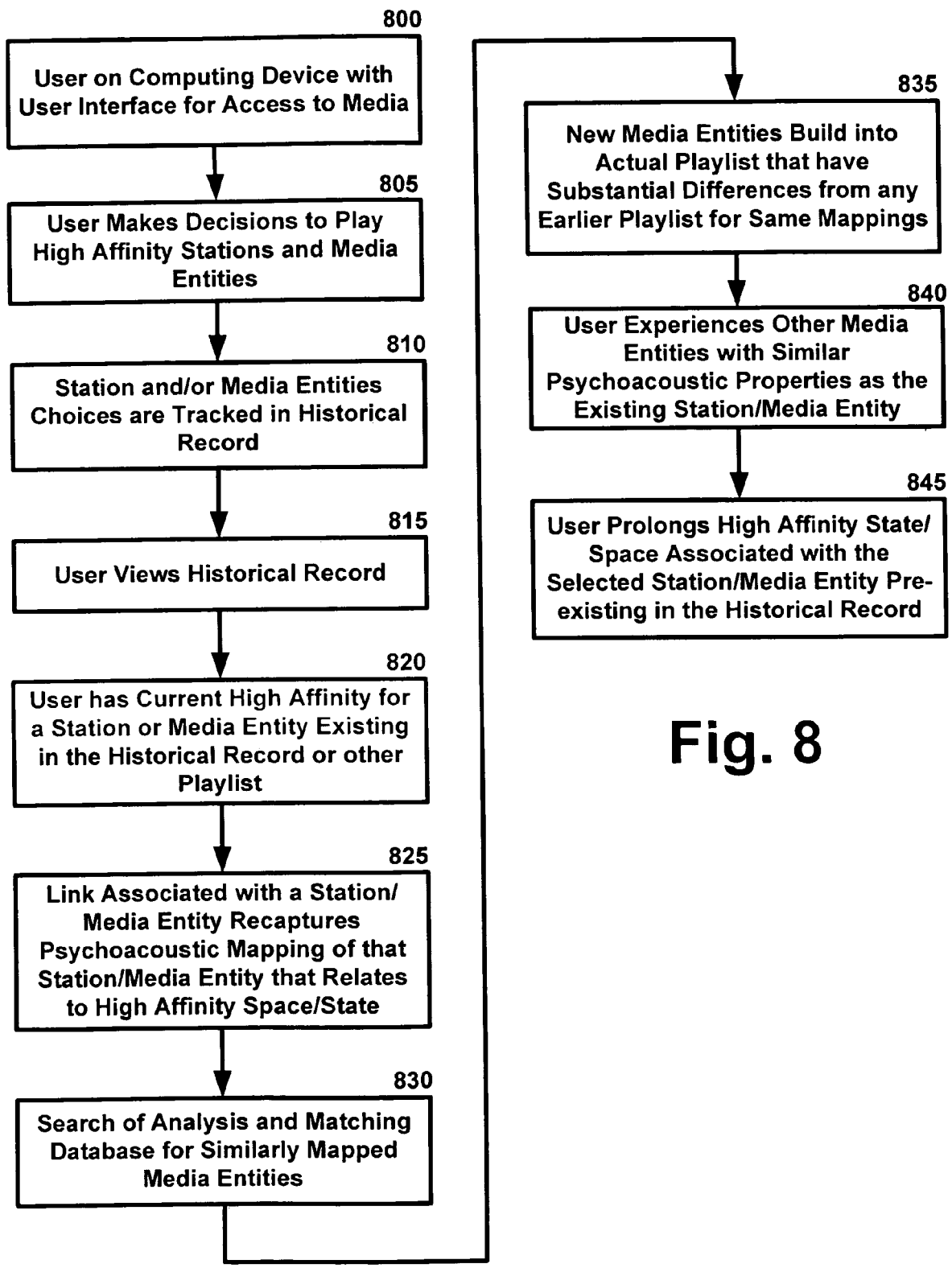
FIG. 8 illustrates an exemplary implementation of a one-step personalized station replay, or one-step personalization based upon a previous media entity selection.

FIG. 8 illustrates an exemplary implementation of a one-step personalized station replay, or one step personalization based upon a previous media entity selection. By accessing the historical record, a user can track decisions that the user has made. Then, with a one step personalization process, the user can restart, select or link to any old media station or media entity in the record. With this input, the musical mapping properties of the station or media entity are re-captured and automatically run through the analysis and matching system. Returned is a playlist of media entities that immediately replaces the existing station or playlist; however, the new set of songs in the already played station is substantially different from the original set of songs for that setting, as described in U.S. patent application Ser. No. 09/638,907, but the new songs equally match the psychoacoustic properties of the station setting. Thus, the present invention provides the ability to leverage the song analysis and matching system to get equally personalized psychoacoustic songs, but not the same songs as before.

Thus, in exemplary detail, at 800, a user finds a computing device having a user interface in accordance with the present invention for accessing any of a variety of types of media, such as music. At 805, the user variously makes decisions as to songs and stations for which the user has a high affinity. At 810, the station and/or song choices are tracked to form a historical record. At 815, a user may view the historical record generated at 810 in connection with the user's choices of 805. At 820, a user decides that a certain station or song in the historical is desirable. At 825, the link associated with the song or station selected at 820 starts an automatic personalization process that forms a playlist according to the selected station or song mappings. At 830, a search of the analysis and matching database is performed to retrieve similarly mapped songs for building into a playlist. At 835, new media entities are returned for a new playlist. As mentioned, the new set of songs in the already played station is different from the original set of songs for that setting. At 840, the user experiences other media with similar psychoacoustic properties as the selected song or station. At 845, the user can opt to prolong the high affinity state/space associated with the newly formed playlist.

Figure 9:
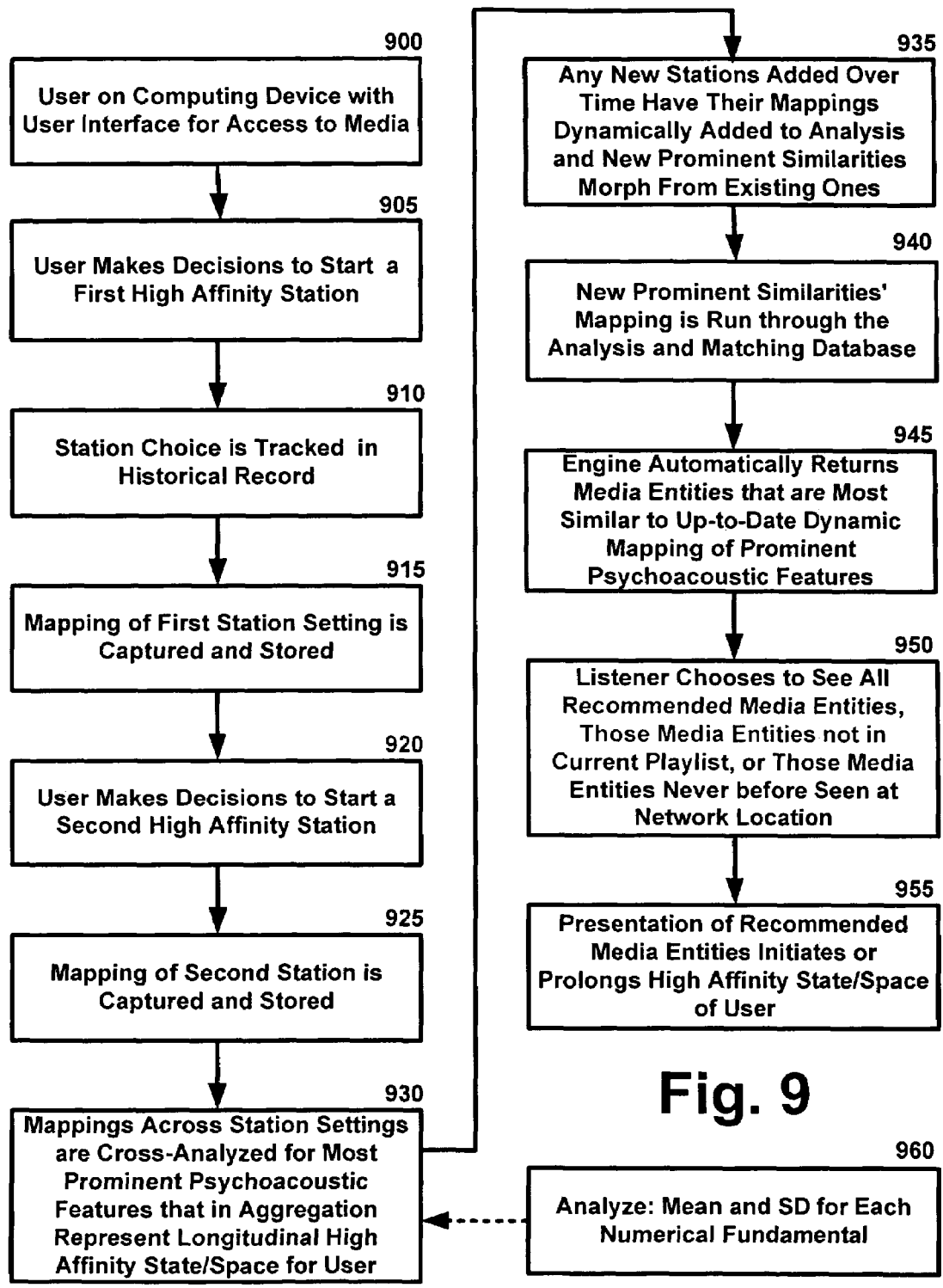
FIG. 9 illustrates an exemplary process of the operation of a dynamically updated recommendation engine in accordance with the present invention.

FIG. 9 illustrates an exemplary process of the operation of a dynamically updated recommendation engine in accordance with the present invention. By analyzing a user's historical record and leveraging this information with the song analysis and matching system, a user automatically receives song recommendations that match trends seen in the fundamental musical properties of the historical user record. Once a record has begun, there is a dynamically updated analysis of the record. With every new station setting, the engine re-analyzes up to the totality of the user's station decisions to extract core patterns or psychoacoustic preferences seen in the record. This mapping has the potential for dynamic morphing with every new station choice. The analysis and matching system then searches the database for other entities with similar mappings. Automatically returned are highly targeted songs that have similar psychoacoustic properties as the core mapping patterns. A user receives, by choice, all songs that fit the mapping, those songs that both fit the mapping and have not been played on the current playlist, or those songs that both fit the mapping and have not been played on the radio in any playlist to date.

Thus, in exemplary detail, at 900, a user finds a computing device having a user interface in accordance with the present invention for accessing any of a variety of types of media, such as music. At 905, the user makes a decision to play a first station for which the user has a high affinity. At 910, the station (and/or song choices) is tracked to form a historical record. At 915, a mapping of the selected first station is captured and stored. At 920, the user makes a decision to play a second station for which the user has a high affinity. At 925, a mapping of the selected second station is captured and stored. At 930, mappings across the station settings are cross analyzed for the most prominent psychoacoustic features that in aggregation represent longitudinal high affinity state/space for the user. This, for example, is accomplished through an analysis at 960 that records the mean and standard deviation for each numerical fundamental used in the classification chain. At 935, any new stations (third, fourth, etc.) added over time also have their mappings dynamically added to the analysis and new prominent similarities morph from existing ones. At 940, the up to date prominent similarities' mapping is run through the analysis and matching database. At 945, the engine of the invention automatically returns media entities that are most similar to the up to date dynamic mapping sent to the database at 940. At 950, in an exemplary implementation, the user chooses to see all recommended media entities, those media entities not in the current playlist, or those media entities never before seen at the network location or Site. At 955, the presentation of recommended media entities initiates or prolongs the user's high affinity state/space associated with the newly chosen recommended playlist.

The present invention also may utilize a system of rating media entities that leverages the analysis and matching system to personalize a user's experience. By linking to the analysis and matching database, this rating system has capabilities beyond rating systems that compare one user's preferences to another's i.e., collaborative filtering systems. For example, in the context of music, these rating capabilities could work on a variety of rating scales, both active and passive, including but not limited to "hot/not" ratings, an "N-star rating scale" whereby the number of stars selected is proportional to the user's affinity for the music, implicit low affinity for skipped songs, most common sounds like query songs, most commonly played clips on radio/site, etc. Furthermore, users may specify ratings at higher levels of the data hierarchy, including but not limited to the album, artist, or genre level. These ratings would "bubble down" to the song contained therein; a rating of an artist, for example, would necessarily affect in a proportional manner the ratings of that artist's albums, which in turn would proportionally affect the respective ratings of the songs on those albums.

FIG. 10 illustrates an exemplary process wherein a user's preference profile is dynamically updated. By monitoring a user's ongoing ratings, the initial conditions for that user's high affinity state/space can be represented. For example, when a song is rated positively, its mapping is recorded. By taking the aggregated mappings of positively rated songs, the analysis system may look for core psychoacoustic properties in the aggregation that define the initial conditions for that user's high affinity state/space. When a song is rated negatively, its mapping may also be recorded. By taking the aggregated mappings of negatively rated songs, the analysis system may look for core psychoacoustic properties in the aggregation that define the initial conditions for a particular user's low-affinity state/space. With every rating, these profiles for high and low-affinity state/spaces are remapped on-the-fly.

This overall high/low-affinity preference profile may then be utilized as a basis for dynamically seeding a playlist generator with likelihood weightings for all potential songs in the roll-up. Songs matching the high affinity state are weighted as more likely to play. Songs matching the low-affinity state are weighted as less likely to play, or these songs are blocked from playing altogether if enough other songs exist to generate a playlist of acceptable length. As mentioned, U.S. patent application Ser. No. 09/638,907 describes more specific methods for playlist construction based upon frequency or weights of preferences, and the like.

Thus, in an exemplary implementation, at 1000, a user finds a computing device having a user interface in accordance with the present invention for accessing any of a variety of types of media, such as music. At 1005, the user makes a decision to rate a media entity, such as a song, as representative of the user's high or low affinity state/space. This may be done at 1045 via an active rating or a passive rating. Active ratings are ratings that include action on the part of the user for the purpose of assigning a rating, such as the user rating the song as good or bad, hot or riot, etc., the user assigning a rating from 1 to 10 to the song, the user skipping a song thereby suggesting that the song is of low affinity for the user, and the like. Passive ratings may be extracted from actions on the part of the user, but these include actions that are not done for the explicit purpose of assigning a rating. Passive ratings, for example, might include identifying the most frequent "sounds like" queries made by the user, identifying the most commonly played songs by the user, identifying the most commonly skipped songs by the user, and the like. At 1010, if the media entity rated at 1005 is representative of the user's high affinity space, then a mapping of positively-rated media entity is captured and compared to existing high/low affinity mappings in the historical record. At 1015, if the media entity rated at 1005 is representative of the user's low affinity space, then a mapping of negatively-rated media entity is captured and compared to existing low affinity mappings. At 1020, the engine automatically builds or updates a preference profile corresponding to the user's preferences for high affinity and low affinity psychoacoustic properties. At 1025, the user makes a decision to start a high affinity station. At 1030, this causes a search of the analysis and matching database to be performed to find media entities that are similar to dynamically updated preference profile built at 1020. At 1035, a playlist is dynamically generated based upon seed mappings with likelihood weightings for all potential media entities in the roll-up, wherein a high affinity profile corresponds to an increase in likelihood and a low affinity profile corresponds to a decrease in likelihood. At 1040, the user may opt to prolong the high affinity state/space associated with the aggregated set of ratings over the user's entire history.

FIG. 11 illustrates another exemplary ratings-based process in accordance with the present invention for dynamically updating a recommendation engine. By monitoring a user's ratings, that user's current high affinity state/space is captured. When a song is rated, its specific psychoacoustic properties are mapped. If the rating is positive, then the mapping is compared with the dynamically updating recommendation engine based on the user's historical record. If a core psychoacoustic property exists in the positively rated song that is not represented in the dynamically-updated mapping, then the recommendation engine uses the analysis and matching system to search the database for additional songs that have a similar mapping as this newly identified high affinity psychoacoustic property. Automatically returned are specific, highly targeted songs that have similar psychoacoustic properties as the core mapping pattern. A user receives, by choice, all songs that fit the mapping, those songs that both fit the mapping and have not been played on the current playlist, or those songs that both fit the mapping and have not been played on the radio in any playlist to date.

In an exemplary implementation, at 1100, a user finds a computing device having a user interface in accordance with the present invention for accessing any of a variety of types of media, such as music. At 1105, the user makes a decision to rate a media entity, such as a song, as representative of the user's high or low affinity state/space. This may be done at 1135 via an active rating, including but not limited to such examples as the user rating the song as good or bad, hot or not, etc., the user assigning a rating from 1 to 10 to the song, the user skipping a song thereby suggesting that the song is of low affinity for the user, and the like. At 1110, if the media entity rated at 1105 is representative of the user's high affinity space, then a mapping of positively-rated media entity is captured and compared to existing high affinity mappings in the historical record. At 1115, the prominent distinctions in psychoacoustic properties between the rated media entity and the historical record are extracted. At 1120, the engine automatically returns media entities that are most similar to the dynamic mapping of distinct psychoacoustic features updated at 1115. At 1125, the user chooses to see all recommended media entities, those songs not in the current playlist or those songs never before seen at the site. At 1130, the site presents the newly recommended entities that correspond to the user's choice at 1125 may prolong the high affinity state/space associated with the entities.

As mentioned above, the media contemplated by the present invention in all of its various embodiments is not limited to music or songs, but rather the invention applies to any media to which a classification technique may be applied that merges perceptual (human) analysis with digital signal processing (DSP) analysis for increased accuracy in classification and matching.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of music data, one skilled in the art will recognize that the present invention is not limited to the music, and that the methods of tailoring media to a user, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for generating at least one playlist of high affinity media entities, comprising:
    selecting contents of a first media station;
    storing said selected contents and the first media station in a historical record;
    analyzing said stored contents and the first media station to extract a first set of classification mappings;
    selecting contents of a second media station;
    analyzing said selected contents of the second media station to extract a second set of classification mappings;
    cross-analyzing said first and second sets of classification mappings to generate a prominent set of classification mappings that represent high affinity space for a user performing said selecting of said contents of first and second media stations;
    searching a matching database for media entities having similar mappings to the prominent set of classification mappings, wherein the media entities in the matching database have been classified according to a classification system characterized by the convergence of perceptual and digital signal processing classification techniques; and
    generating a high affinity playlist that includes at least one of said media entities.

2. The method of claim 1, further comprising:
    before said generating of said playlist, selecting at least one of all of said media entities, media entities that are not in a currently rendered in a playlist and media entities that have never been rendered as reflected by said historical record.

3. The method of claim 1, further comprising:
    selecting a third media station;
    analyzing the selected third media station to extract a third set of classification mappings; and
    cross-analyzing said third media against said first and second sets of classification mappings to update said prominent set of classification mappings that represent high affinity space for a user performing said selecting of said third media station.

4. The method according to claim 3, wherein said selecting of said first media station includes inputting a link to said one of first media station, said selecting of said second media station includes inputting a link to said one of second media station and said selecting of said third media station includes inputting a link to said one of third media station.

5. The method according to claim 3, wherein said selecting of said first media station includes selecting a first radio station, said selecting of said second media station includes selecting a second radio station and said selecting of said third media station includes selecting a third radio station.

6. The method of claim 1, wherein said cross-analyzing includes calculating the mean and standard deviation for each numerical fundamental of the classification system.

7. The method according to claim 1, further comprising persisting the prominent set of classification mappings.

8. The method according to claim 7, wherein said persisting comprises storing at least one of the prominent set of classification mappings and the high affinity playlist.

9. The method according to claim 1, further comprising accessing a site of a network-enabled computing device, the site having means to render media entities to a user.

10. The method according to claim 1, wherein said analyzing of the selected second media station, said cross-analyzing of said first and second sets of classification mappings, said searching of said matching database and said generating of said playlist occur automatically in response to said selecting of said second media station.

11. A computer storage readable medium bearing computer executable instructions configured to be executed by a processor for carrying out the method of claim 1.

12. A computing device comprising a processor executing instructions for carrying out each of the steps of the method of claim 1.

* * * * *